(12) United States Patent
Canós et al.

(10) Patent No.: US 6,846,406 B2
(45) Date of Patent: Jan. 25, 2005

(54) PROCESS AND CATALYSTS FOR ELIMINATING SULPHUR COMPOUNDS FROM THE GASOLINE FRACTION

(75) Inventors: Avelino Corma Canós, Valencia (ES); Marcelo Eduardo Domine, Valencia (ES); Cristina Martinez Sánchez, Valencia (ES)

(73) Assignees: Consejo Superior de Investigaciones Cientificas, Madrid (ES); Universidad Politecnica de Valencia, Valencia (ES)

(*) Notice: Subject to any disclaimer, the term of this patent is extended or adjusted under 35 U.S.C. 154(b) by 0 days.

(21) Appl. No.: 10/412,116

(22) Filed: Apr. 11, 2003

(65) Prior Publication Data

US 2003/0183555 A1 Oct. 2, 2003

Related U.S. Application Data

(63) Continuation of application No. PCT/ES01/00388, filed on Oct. 11, 2001.

(30) Foreign Application Priority Data

Oct. 11, 2000 (ES) .................................... P 200002520

(51) Int. Cl.$^7$ .................. C10G 27/00; C10G 29/00
(52) U.S. Cl. .................. 208/208 R; 208/240; 208/245; 208/249; 208/196
(58) Field of Search .................. 208/208 R, 240, 208/245, 249, 196

(56) References Cited

U.S. PATENT DOCUMENTS

| | | |
|---|---|---|
| 3,341,448 A | 9/1967 | Ford et al. |
| 3,816,301 A | 6/1974 | Sorgenti |
| 3,847,800 A | 11/1974 | Guth et al. |
| RE28,341 E | 2/1975 | Wadlinger et al. |
| 3,919,402 A | 11/1975 | Guth et al. |
| 4,410,501 A | 10/1983 | Taramasso et al. |
| 4,830,733 A | 5/1989 | Nagji et al. |
| 5,824,207 A | 10/1998 | Lyapin et al. |
| 5,910,440 A | 6/1999 | Grossman et al. |

FOREIGN PATENT DOCUMENTS

| | | |
|---|---|---|
| EP | 0 029 472 A1 | 6/1981 |
| EP | 0 271 264 A1 | 6/1988 |
| EP | 0 482 841 | 4/1992 |
| WO | WO 94/02245 | 2/1994 |
| WO | WO 00/34181 | 6/2000 |
| WO | WO 00/44670 | 8/2000 |
| WO | WO 00/47696 | 8/2000 |
| WO | WO 01/37629 A2 | 5/2001 |
| WO | WO 01/48119 A1 | 7/2001 |

OTHER PUBLICATIONS

Bonde, SE et al., DMSO Extraction of Sulfones from Selectively Oxidized Fuels, Am. Chem. Soc., Div. Petrol. Chem, Prepriints, 44(2), (1998) p. 199–201.

Dolbear, GE, et al., Selective Oxidation as a Route to Petroleum Desulfurization, Am. Chem. Soc., Div. Petrol. Chem, Preprints 45 (2000), p. 375–378.

Zannikos, F., et al., Desulfurization of petroleum fractions by oxidation and solvent extraction, (1995) Elsevier, Fuel Processing Technology 42 (1995) pp. 35–45.

Collins, FM, et al., Oxidative desulphurisation of oils via hydrogen peroxide and heteropolyanion catalysis, Journal of Molecular Catalysis A: Chemical 117 (1997) pp. 397–403.

Reddy, RS., et al., Sulfoxidatin of Thioethers using Titanium Silicate Moleculr Sieve Catalysts, J. Chem. Soc., Chem. Commun, 1992, pp. 84–85.

Hulea, V., et al., Thioether oxidation byhydrogen peroxide using titanium–containing zeolites as catalysts, Journal of Molecular Catalysis A; Chemical 111 (1996) pp. 325–332.

Blasco, T., et al., Direct Synthesis and Characterization of Hydrophoboc Aluminum–Free Ti–Beta Zeolite, J. Phys. Chem. B (1998), 102, 75–88.

van der Waal, JC., et al., Zeolite titanium beta: A versatile epoxidation catalyst, Solvent effects, Journal of Molecular Catalysis A: Chemical 124 (1997), p. 137–146.

van der Waal, JC, et al., Synthesis and characterization of aluminum–free zeolite titanium beta using di(cyclohexylmethyl)dimethylammonium as a new and selective template, Microporous and Mesoporous Materials 25 (1998), pp. 43–57.

Corma, A., et al., Activity of Ti–Beta Catalyst for the Selective Oxidation of Alkenes and Alkanes, Journal of Catalysis 145, (1994), pp. 145–151.

Corma, A., et al., Solvent Effects during the Oxidation of Olefins and Alcohols with Hydrogen Peroxide on Ti–Beta Catalyst: The Influence of the Hydrophilcity–Hydrophobicity if the Zeolite, Journal of Catalysis 161, (1996), pp. 11–19.

Kabe, T., Base de datos WP1 Derwent, AN 1999–367346 [31] & JP 11140462A.

*Primary Examiner*—Walter D. Griffin
*Assistant Examiner*—James Arnold, Jr.
(74) *Attorney, Agent, or Firm*—Klauber & Jackson

(57) ABSTRACT

The object of the present invention is a process for the elimination of sulphur compounds from the gasoline fraction, characterized in that it comprises carrying out an oxidation reaction of said sulphur compounds using at least one organic-inorganic composite as a catalyst which comprises at least:

Si,
Ti and
silicon linked to carbon and using organic or inorganic hydro-peroxides as oxidating agents.

According to the process for the present invention, said organic or inorganic composite is obtained by means of a process that comprises a sililation stage during synthesis or by means of a process that comprises a post-synthesis sililation stage.

50 Claims, No Drawings

PROCESS AND CATALYSTS FOR ELIMINATING SULPHUR COMPOUNDS FROM THE GASOLINE FRACTION

This application is a continuation of PCT/ES01/00388 filed Oct. 11, 2001.

BACKGROUND

Although the hydro-sulphurisation (HDS) processes have dominated the de-sulphurisation of liquid fuels in the past, their cost and the need to decrease the sulphur levels in the composition of gasolines, to a range of 10–100 ppm, have combined to encourage the development of alternate technologies. Various alternate processes for the de-sulphurisation of gasoline and diesel have been explored, such as direct adsorption (Nagi et al. U.S. Pat. No. 4,830,733, 1983), selective oxidation (S. E. Bonde et al. *ACS Div. Pet. Chem. Preprints*, 44[2], 199, 1998; E. D. Guth et al. U.S. Pat. No. 3,919,405, 1975; J. F. Ford et al. U.S. Pat. No. 3,341,448, 1967) and bio-processing (M. J. Grossman et al. U.S. Pat. No. 5,910,440, 1999; A. P. Borole et al. *ACS Div. Pet. Chem. Preprints*, 45, 2000).

In the case of the oxidating de-sulphurisation processes (ODS), an economic system is sought that is sufficiently selective to oxidate the sulphur compounds, thus increasing their polarity and molecular weight facilitating their later separation by extraction or distillation. Until this moment, no commercial oxidating de-sulphurisation process has been developed basically due to the combination of regulatory and economic requirements on an industrial scale, although a wide variety thereof exist under development (S. E. Bonde et al. *ACS Div. Pet. Chem. Preprints*, 45,375, 2000).

The elimination of the sulphur present in the liquid fuels such as sulphurs, di-sulphurs and mercaptans can be performed by means of the use of organic peroxyacids, such as peroxyacetyl acid which allows decreases in the sulphur content of some gasolines of around 95% working at temperatures of between 2 and 100° C. (S. E. Bonde et al. *ACS Div. Pet. Chem. Preprints*, 44[2], 199, 1998), although peroxysulfuric and peroxoborate acids have also been used (F. Zannikos et al. *Fuel Proc. Tech.*, 42, 33, 1995) and even other inorganic oxidants such as $O_3$ and oxidant species of the $O_3^{-2}$ type generated from these (A. G. Lyapin et al. U.S. Pat. No. 5,824,207, 1998) and Nitrogen oxide E. D. Guth et al. U.S. Pat. No. 3,847,800, 1974 and U.S. Pat. No. 3,919,405, 1975); as well as experiences with the presence of catalysts. Among the latter the following stand out: the use of heteropolyacids of the peroxotungstophospates in two-phase systems, with $H_2O_2$ as an oxidant and phase transfer agents, which obtain excellent conversions of mercaptans, dibenzothiophenyls and dibenzothiophenyl substitutes (above 90%), but a poor decrease in thiophene and benzothiophene compounds (F. M. Collins et al. *J. Mol. Catal. A:Chem.*, 117, 397, 1997); the use of solid catalysts, among these the microporous titanosilicates of the TS-1 and TS-2 types, with an excess of the various organic and inorganic oxidants, in liquids that contain Sulphur compounds that achieve low levels of conversion of the corresponding sulfones (T. Kabe JP 11140462 A2, 1999).

In general, the selective oxidation of compounds of the benzothiophene, dibenzothiophene families and their respective alkyl, di-alkyl and tri-alkyl homologue substitutes is problematical and has not been carried out with total success up to the present time. Catalysts of the TS-1 and TS-2 types, based on microporous titanosilicates with a zeolite structure (M. Taramasso et al. U.S. Pat. No. 4,410,501, 1993), permit selective oxidation of different sulphurs with oxygenated water (R. S. Reddy et al. *J. Chem. Soc., Chem. Commun.*, 84, 1992; V. Hulea et al. *J. Mol. Catal. A: Chem.*, 111, 325, 1996); but their small pore opening makes their use in processes wherein much larger molecules are involved impossible, such as the case of the benzothiophenes and the alkyl-benzothiophenes, the main components in the group of compounds with sulphur present in heavy gasoline and diesel cuts.

DESCRIPTION OF THE INVENTION

The object of the present invention is a process for the elimination of sulphur compounds from the gasoline fraction characterised in that it comprises:
a step of making an oxidation reaction between said sulphur compounds and organic or inorganic hydro-peroxides as oxidation agents in the presence of at least one organic-inorganic composite as a catalyst, wherein said catalyst comprises at least the following:

Si,

Ti and silicon linked to carbon said oxidation reaction made at a temperature between 10 and 120° C. and during a reaction time between 2 minutes and 24 hours, and a step of separating the products of the oxidation reaction by distillation, extraction with a solvent or combination of both.

According to the process for this invention, this organic or inorganic composite that comprises at least Si, Ti and silicon linked to carbon, is obtained by means of a process that comprises a sililation stage during synthesis or by means of a process that comprises a post-synthesis sililation stage.

These organic or inorganic composites can be a microporous molecular sieve that comprises at least Si, Ti, and silicon linked to carbon, or can consist of amorphous inorganic silicon solids chemically combined with Ti in proportions between 0.2 and 8% in Ti weight in the form of an oxide on the total catalyst, and which contains silicon linked to carbon.

A suitable microporous molecular sieve has the following chemical formula in its calcinated and anhydrous state:

wherein:

X represents at least one trivalent element, y is comprised between 0 and 0.2,

A represents mono-, di- or trivalent cations, or mixtures thereof, n=1, 2 or 3,

T represents at least one tetravalent element other than Si and Ti, t is comprised between 0 and 1, and x is comprised between 0.005 and 1000, Said microporous molecular sieve is synthesised in the presence of compounds that contain Si—C groups, or is submitted to a post-synthesis sililation stage creating Si—C bonds.

The forerunner of a mesoporous molecular sieve used as a catalyst can have the chemical formula:

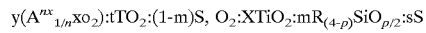

wherein x can vary between 0.005 and 0.1, A represents one or more mono-, di- or trivalent compensation cations or mixtures thereof, X corresponds to a trivalent element, y is comprised between 0 and 0.2, n is 1, 2 or 3 , T corresponds to tetravalent elements other than Si and Ti, t is between 0 and 0.2 , S can be an organic compound, m is comprised between $10^{-6}$ and 0.66, p is comprised between 3 and 1, where R is an alkyl or aromatic group, or a combination of both that comes from the sililating agent that contains the Si—C bonds. The organic compound corresponding to the S group is extracted by chemical means and the mesoporous molecular sieve is subjected to post-synthesis treatment with a sililation agent that leads to the formation of new Si—C bonds.

Among said micro and mesoporous solid materials can be quoted, for example, the microporous materials zeolite Beta, zeolite ITQ-7, Mordenite, UTD-1 and in general microporous solids that contain channels with rings of 12 or more members, or among the mesoporous materials can be quoted ordered mesoporous materials for example MCM-41, MCM-48, SBH-15, HMS, and other amorphous materials such as amorphous silica. Titanium is introduced in the synthesis stage or in a treatment after synthesis. Furthermore, said materials can show organic groups anchored on their surface. The oxidising agents are organic hydroperoxides such as, for example, t-butyl hydroperoxide or cumene hydroperoxide, or inorganic oxidants such as hydrogen peroxide or sodium hypochlorite, without these being limiting examples. By means of this selective oxidation, the sulphur compounds present in the gasoline fraction—both in the light and heavy fractions—are transformed into other products with a different boiling point and different polarity that have a boiling point cutting off of the gasolines and/or which can be easily extracted by distillation or extraction following conventional techniques. High conversions and selections in the oxidation of these sulphur compounds are achieved by means of the process of this invention.

The oxidation of the sulphur compounds of the gasoline is carried out by putting a reactive mixture that contains the gasoline fraction and the organic or inorganic hydroperoxide in contact with the micro or mesoporous solid catalyst containing Si—C species, the anchored silica with Ti, or a mixture thereof, at a temperature between 10 and 120°, during reaction times that can vary between 2 minutes and 24 hours depending on the catalyst and the reaction conditions employed. The weight ratio of the gasoline fraction to the catalyst is between 5 and 200 and preferably between 10 and 100, the weight ratio between the gasoline fraction and the oxidising agent being between 200 and 10, and preferably between 100 and 30. The hydrophilic or hydrophobic properties of the catalyst can be modified by means of the synthesis conditions by which the molecular sieves are obtained or by means of the anchoring of the organo-silicate compounds on the surface of the micro or mesoporous solid or the amorphous silica, the result of this anchoring being an organic or inorganic composite that has silicon linked to carbon, and adapting these to the specific characteristics of the reactants. The incorporation of titanium in the molecular sieves containing pores with rings of 12 or more members, or in mesoporous materials, can be performed by means of direct synthesis, wherein the titanium precursor is added to the synthesis gel, or, by means of later anchoring of the titanium compounds on the surface of the micro- and mesoporous materials, leading to a species of Ti isolated after a calcination process.

As non-limiting examples of the catalysts used, those formed by Ti-Beta, Ti-MCM-41 and Ti-aerosil are described below, together with those formed by Ti-MCM-41 and Ti-aerosil containing Si—C groups.

Catalysts based on microporous material with the following chemical composition in their anhydrous or calcinated state are described:

$$y(A_{1/n}{}^{n+}XO_2):tTO_2:SiO_2:xTiO_2$$

where x corresponds to a trivalent element such as, for example, Fe, Al, B, Ga, Cr or a mixture thereof, being y between 0 and 0.2. A corresponds to mono-, di- or trivalent cations, or mixtures thereof, where n=1, 2 or 3. T corresponds to tetravalent elements other than Si and Ti such as, for example, V, Sn, t is between 0 and 1 and preferably between 0 and 0.2, and x is between 0.005 and 1000 and preferably between 0.01 and 100.

As a general example of microporous materials, the preparation of a Beta zeolite containing Ti is described. The process consists of heating, at temperatures between 90 and 200° C., a reactive mixture that contains a silica source (amorphous silica, colloidal silica, silica gel, tetraalkylorthosilicate, etc., preferably amorphous silica or tetraalkylorthosilicate), a titanium source (alkoxide or halide, preferably Ti tetraethoxide, tetrapropoxide or tetrabutoxide), a structure cation director (preferably tetraethyl ammonium, TEA), water, optionally $H_2O_2$, and optionally a fluoride anion source (fluorhydric acid, ammonium fluoride, etc.), avoiding the presence of alkaline anions. In the case of using fluoride anions, the source thereof and of the organic cations is selected in such a way that the final pH, after crystallisation is produced, is within the range of 6 to 12, preferably in the 8–9.5 range. In the case of not using fluoride anions, the final pH is greater than 10.5. The composition of the synthesis mixture is characterized by the following ranges of molar relations:

$H_2O/SiO_2$=4–50, preferably 4–20, more preferably 4–10.
TEAOH $SiO_2$=0.125–0.80, preferably 0.15–0.72.
$HF/SiO_2$=0.2
$SiO_2/TiO_2$=2–10000
$H_2O_2/TiO_2$=0–50, preferably 0–20.

With the object of favouring crystallisation, it may be convenient to add Beta zeolite crystals to the reactive mixture so that they act as seeds. These crystals can be added as a dry solid, as a suspension of crystals in a suitable liquid or as a pre-organised gel.

In the case of using F anions in the synthesis, the recovery of the zeolite can be performed by means of separating their mother liquor by filtering, while in the case of not using these, centrifuging is necessary for the separation of the solid. As a result, materials with a high crystallinity are obtained that have an X-ray diffracting pattern coinciding with that of the Beta zeolite (U.S. Pat. No. 28, 341) that can be calcinated to eliminate the occluded organic material. A suitable calcination method consists of heating $N_2$ or another inert gas in an atmosphere of air, in a vacuum, to temperatures above 400° C., preferably above 500° C.

The materials obtained in the presence of F anions, in general, possess a greater crystallinity than those synthesised in the OH⁻ medium, due to the absence of connectivity defects of the Si—O⁻ or Si—OH type. Likewise, zeolites prepared in the presence of F⁻ have a marked hydrophobic nature also due to the absence of connectivity defects, while those obtained in the absence of F⁻ have hydrophilic properties (T. Blasco et al. J. Phys. Chem. B, 1998, 102, 75).

Catalysts based on Beta zeolite have an intense band in the UV-Vis spectrum centred around 220 nm, which indicates the presence of Ti in tetrahedric environments and are active and selective in sulphur oxidation reactions in general and in alkyl, alkyl-benzothiophenes, benzothiophenes, alkyl-benzothiophenes, without being limited in particular.

The catalyst based on Ti-Beta zeolite can also be prepared in an OH⁻ medium following, for example, the methods described in the literature (see the following as non-limiting examples of Ti-Beta zeolite synthesis in an OH⁻ medium: D. R. C. Huybretchts et al. (Exxon Chem. Pat., Inc., USA) WO 9402245 A1, 1994; J. C. van de Waal et al. *J. Mol. Catal. A: Chem.*, 124,137, 1998; *Microp. and Mesop. Mat.*, 25, 43, 1998; A. Corma et al. *J. Catal.*, 145, 151, 1994 and 161, 11, 1996; T. Blasco et al. *J. Phys. Chem. B*, 102, 75, 1998).

In these catalysts, species that contain Si—C bonds are introduced in a stage during synthesis, or in a post-synthesis stage, leading to the organic-inorganic composite that is used in the process for the elimination of sulphur compounds in this invention.

In another particular embodiment of the process in this invention, the catalyst precursor based on MCM-41 type mesoporous material has the following molar composition:

$$y(A_{1/n}{}^{n+}XO_2):tTO_2:SiO_2:xTiO_2:sS$$

where x can vary between 0.005 and 0.1; X corresponds to a trivalent element such as, for example, Fe, Al, B, Ga, Cr or a mixture thereof, being y comprised between 0 and 0.2, A corresponds to mono-, di- or trivalent compensation cations, or mixtures thereof, where n =1, 2 or 3, T corresponds to tetra-valent elements other than Si and Ti such as, for example, V, Sn, and t is between 0 and 1 and preferably between 0 and 0.2 S can be an organic compound such as, for example, a cationic, anionic or neutral surface active agent. The cationic surface active agents respond to the formula $R_1R_2R_3R_4Q+$ wherein Q is nitrogen or phosphorus and where at least one of the $R_1R_2R_3R_4$ substituents is an alkyl or aryl group containing more than 6 atoms of carbon and less than 36, and each one of the remaining $R_1R_2R_3R_4$ groups is a hydrogen or aryl or alkyl group with less than five carbons. The so-called geminal surface active agents, $R_1R_2R_3Q(R_4R_5QR_6QR_4R_5)Q_nR_1R_2R_3$ or $R_1R_2R_3QR_4QR_1R_2R_3$ are included in the cationic surface active agents that can be included in the composition of the gel, where Q is nitrogen or phosphorus and at least one of the $R_1$–$R_6$ substitutes is an aryl or alkyl group with more than five atoms of carbon or mixtures thereof. In these cases two of the $R_1$, $R_2$, $R_3$, or $R_4$ groups can be interconnected leading to cycled compounds. The cationic surface active agents are introduced in the composition of the synthesis gel in the form of a hydroxide, halide, nitrate, sulphate, carbonate or silicate or mixtures thereof. Non-limiting examples thereof are cetyl tri-methyl ammonium, dodecyl tri-methyl ammonium, cetyl piridinium, cetyl methylphosphonium, etc.

S may also refer to a neutral surface active agent, wherein case it responds to the formula $R_1R_2R_3$ where Q is nitrogen or phosphorus and where at least one of the $R_1$, $R_2$, or $R_3$ substitutes is an alkyl or aryl group containing more than 6 atoms of carbon and less than 36, and each one of the remaining $R_1$, $R_2$, or $R_3$ groups is a hydrogen or aryl or alkyl group with less than five carbons, non-limiting examples being dodecylamine, cetylamine and cetylpyridine. Compounds that respond to the formula nR-EO can also act as neutral surface active agents. These consist of alkylpolyethylene oxides, alkyl-aryl-polyethylene oxides and alkylpolypropylene and alkylethylene co-polymers, non-limiting examples being the commercial surface active agents denominated Tergitol 15-S-9, Triton X-114, Igepal RC-760, Pluronic 64 L, Tetronic and Sorbitan. Esters derived from fatty acids obtained by reaction with short chain alcohols, sugars, amino acids, amines and polymers or co-polymers derived from polypropylene, polyethylene, polyacrylamide or polyvinyl alcohol may also be included in the formulation, non-limiting examples being lisolecitin, lecitin, dodecyl penta-oxyethelene ether, phosphatyl di-lauryl di-ethanol amine, di-galactose diglyceride and monogalactose diglyceride. The surface active agent can also be an anionic surface active agent that responds to the formula RQ⁻where R is an alkyl or aryl group containing more than 6 atoms of carbon and less than 36, and Q is a sulphate, carboxylic or phosphate group, non-limiting examples being dodecyl sulphate, stearic acid, OT Aerosol and phospholipids such as phosphatyl choline and phosphatyl di-ethanolamine and s can vary between 0 and 0.5.

Synthesis of these mesoporous catalysts is performed by preparing an MCM-41 type gel with a molar composition:

$$y(A_{1/n}{}^{n+}XO_2):tTO_2:SiO_2:xTiO_2:sS:mTAAOH$$

where x can vary between 0.005 and 0.1; X corresponds to a trivalent element such as, for example, Fe, Al, B, Ga, Cr or a mixture thereof, being and included between 0 and 0.2, and preferably between 0.0.1, A corresponds to mono-, di- or trivalent compensation cations, or mixtures thereof, where n=1, 2 or 3, T corresponds to mono-, di- or trivalent compensation cations, or mixtures thereof, where n=1, 2 or 3. T corresponds to tetravalent elements other than Si and Ti such as, for example, V, Sn, and t is comprised between 0 and 1, and preferably between 0 and 0.2. S may be a cationic, anionic or neutral surface active agent and can be any of those mentioned above. TAAOH refers to a hydroxide of tetra-alkyl ammonium, tetra-aryl ammonium or aryl-alkyl ammonium, ammonium, alkaline ammonium, alkali-earth or mixtures thereof, m may vary between 0 and 10; and s may vary between 0 and 5.

Synthesis of these materials is carried out by preparing an aqueous or alcohol solution or a mixture of water/alcohol containing the TAAOH. A pure silica source in stirring solution is added to this, stirring constantly and at temperatures between 0 and 90° C. Finally, a pure titanium source in solution is added to the reactant mixture. An oxide, oxy-hydroxides, alco-oxides, halides or any of their salts may be employed as sources of Ti and/or Si, and in general any Ti and/or Si compound amenable to hydrolysis in the reaction conditions. This solution also contains the surface active agent.

The resulting mixture is stirred until complete homogeneity is obtained for a time between 0.1 minutes and 60 hours in order to eliminate part or all of the alcohols that may have been introduced in the synthesis gel.

The resulting mixture is put into an autoclave and heated to between 20 and 200° C. for a time between 10 minutes and 60 hours. The final solids are separated from the mother liquor, they are washed with water, alcohol or water-alcohol mixtures and then dried.

The occluded organic material in the pores of the materials can be eliminated by means of calcinations at temperatures between 300 and 1100° C., or by means of treatment with a mixture of one or various mineral or organic acids in a solvent that can be water, alcohol, hydrocarbons or mixtures thereof. As acids, sulphuric acid, nitric acid, chlorhydric acid, perchloric acid, acetic acid, mono-, di- or tri-chloracetic acid, mono-, di- or tri-fluoracetic acid are preferred, these being non-limiting examples. The object of this treatment is to extract the surface active agent or other organic residue that may remain occluded in the pores of the catalyst. This treatment is carried out at temperatures between 0 and 250° C. in one or more successive extraction stages, although generally two or three stages tend to be sufficient for extracting all the organic matter from the interior of the pores. The duration of this treatment is between 10 minutes and 40 hours depending on the acid or mixture of acids employed, the extraction temperature, the solvent and the liquid/solid ratio, the preferred range for the latter being between 5 and 100 g·g$^{-1}$.

These materials have a high specific surface area of between 200 and 1500 m$^2$·g$^{-1}$ and show an intense band on the UV-Vis spectrum centred around 220 nm, which indicates the presence of Ti in tetrahedric environments.

Species that contain Si—C bonds are introduced in these catalysts in a stage during synthesis, or in a post-synthesis stage, giving rise to the organic-inorganic composite that is used in the process for the elimination of sulphur compounds in the present invention.

These catalysts are active and selective in sulphur oxidation reactions in general and in alkyl or aryl sulphurs, thiophene, alkyl-thiophenes alkyl-benzothiophenes, alkyl-benzothiophenes, without being limited in particular.

In another particular embodiment of the present invention, said catalyst for the oxidation of sulphur compounds can be an organic-inorganic composite that consists of amorphous inorganic siliceous solids, chemically combined with Ti in proportions between 0.2 and 8% by weight of Ti in the form of an oxide on the total catalyst, and contain silicon linked to carbon. Said amorphous inorganic siliceous solids are made up of at least 90% silica, and are in a preferred manner pyrogenic silicas selected between cab-o-sil and Aerosil with specific surfaces of between 40 and 450 m$^2$·g$^{-1}$ and a particle size of between approximately 0.007 and 0.05 microns. Other preferred amorphous inorganic siliceous solids are synthetic silicon inorganic oxides such as, for example, silica gel. These catalysts consisting of amorphous siliceous solids can also contain other elements as well as Si and Ti selected between V, B, Zr, Mo and mixtures thereof in a percentage as a percentage of the total weight and in the form of oxides of less than 8%. Furthermore, these catalysts can contain quantities of between 0.01 and 4% by weight of promoters of the alkaline, alkali-earth group of metals or mixtures thereof, in the form of oxides.

These catalysts are subjected to a sililation process, in a stage during synthesis, or in a post-synthesis stage, leading to the formation of species that contain Si—C bonds, giving rise to the organic-inorganic composite that is used in the process for the elimination of sulphur compounds in this invention.

A preferred process, for preparing Ti-SiO$_2$ catalysts suitable for the elimination of sulphur compounds in the gasoline fraction, consists of treating an amorphous silica, for example, the aerosil type with a compound of Ti, oxides, oxyhydroxides, alcoxides, halides or any of their salts, and preferably Ti tetraethoxide, tetrapropoxide or tetrabutoxide.

The process for the elimination of sulphur compounds from the fraction is characterized by the fact that the oxidation stage is carried out in a discontinuous reactor, a CSTR reactor, in a fixed bed continuous reactor, in a fluidised bed reactor, or a boiling bed reactor, using organic or inorganic hydro-peroxides as oxidant agents. In the case of a discontinuous reactor. The ratio of the gasoline fraction to the catalyst is comprised between 5 and 200, and preferably between 10 and 100, the weight ration between the gasoline fraction and the oxidant agent being comprised between 200 and 10, and preferably between 100 and 30. The temperature of the process is comprised between 10 and 120° C., and preferably between 20 and 80° C.; and the reaction time oscillates between 2 minutes and 24 hours. The products of the oxidation reaction are separated by distillation and/or extraction with a suitable solvent, the rest without a reaction being able to be re-cycled totally or partially to the reactor.

The next examples illustrate the preparation of these materials and the application of them to the selected oxidation reaction of compounds with sulphur contained in light and heavy gasoline fractions, whose compositions are as follows:

Light Gasoline Cut Off >>>>>> LCN (of CEPSA)
Composition
Initial Tb (0° C.) = 41.0 – Final Tb (0° C.) = 198.1

| | Component | % P/P in the Mixture | S in the Mixture (ppm) |
|---|---|---|---|
| Hydrocarbons | Aromatics | 16.78 | — |
| | iso-Paraffins | 33.86 | — |
| | Napthenes | 9.80 | — |
| | Olefins | 34.64 | — |
| | Paraffins | 4.92 | — |
| Compounds with S | Mercaptans | x | 6 |
| | Thiophene | | 60 |
| | 2-Methyl-Thiophen | | 63 |
| | 3-Methyl-Thiophen | | 71 |
| | C2-Thiophen | | 60 |
| | TetrahydroThiophene | | 7 |
| | C3-Thiophene | | 20 |
| | C4-Thiophen | | 5 |
| | Benzo-Thiophene | | 0 |
| | C1-Benzo-Thiophene | | 2 |
| | C2-Benzo-Thiophene | | 1 |
| | C3-Benzo-Thiophene | | 2 |

S in Gasoline (ppm) = 291
Total S (ppm) = 296

Heavy Gasoline Cut Off >>>>>> HCN (of CEPSA)
Composition
Initial Tb (0° C.) = 80.6 – Final Tb (0° C.) = 226.5

| | Component | % P/P in the Mixture | S in the Mixture (ppm) |
|---|---|---|---|
| Hydrocarbons | Aromatics | 81.52 | — |
| | iso-Paraffins | 10.88 | — |
| | Napththenes | 4.43 | — |
| | Olefins | 1.95 | — |
| | Paraffins | 1.22 | — |
| Compounds with S | Marcaptans | x | 8 |
| | Thiophene | | 2 |
| | 2-Methyl-Thiophen | | 13 |
| | 3-Methyl-Thiophen | | 20 |
| | C2-Thiophen | | 94 |
| | C3-Thiophen | | 294 |
| | C4-Thiophen | | 204 |
| | Benzo-Thiophene | | 947 |
| | C1-Benzo-Thiophene | | 7 |

-continued

Heavy Gasoline Cut Off >>>>>> HCN (of CEPSA)
Composition
Initial Tb (0° C.) = 80.6 – Final Tb (0° C.) = 226.5

| Component | % P/P in the Mixture | S in the Mixture (ppm) |
|---|---|---|
| C2-Benzo-Thiophene | | 13 |
| C3-Benzo-Thiophen | | 5 |

S in Gasoline (ppm) = 1583
Total S (ppm) = 1598

EXAMPLES

Example 1

Preparation of a Microporous Beta Type Material Containing Ti in its Composition, in the Presence of $F^-$ Anions 35 gm of tetraethylorthosilicate (TEOS) are hydrolysed in 41.98 gm of tetraethyl ammonium hydroxide (TEAOH, 35% aqueous solution), and 5.96 gm of $H_2O_2$. 3.83 gm of Ti tetraethoxide are then added and the mixture is left being stirred and evaporating the ethanol formed in the hydrolysis of the TEOS. 4.15 gm of HF (48% aq.) are then added and a suspension of Beta zeolite seeds (0.4 gm of de-aluminised Beta zeolite in 2 gm of water). The molar composition of the gel is as follows:

$TiO_2:10SiO_2:6TEAOH:3.6H_2O_2:80H_2O:6HF$

The resulting mixture is heated in autoclaves lined internally with PTFE at 140° C. and during the heating the autoclaves are kept rotating (60 rpm). After 20 days of heating, the mixture is filtered (pH=8.7) and 23 gm of Beta zeolite with high crystallinity are obtained (over 90% through comparison with the standard) for each 100 gm of gel. The Ti content of the zeolite in its calcinated and anhydrous form determined by chemical analysis is 7.3%, expressed as $TiO_2$.

Example 2

Activation of a Catalyst such as that Described in Example 1 by Calcination

This example illustrates the calcination of the Beta zeolite described in the above example to give rise to the catalyst that will be employed in the selective oxidation reaction of compounds with Sulphur.

The solid obtained in the above example is calcinated in an atmosphere of air at 580° C. for 3 hours. The diffraction pattern of the X-rays of the solid obtained indicates that the crystallinity of the material has been maintained.

Example 3

Use of a Material as Described in Example 2 as a Selective Catalyst in the Selective Oxidation Reaction of Compounds with Sulphur 200 mg of a material such as that described in example 2 are introduced in a glass reactor at 60° C. that contains 5000 mg of light gasoline and 200 mg of hydrogen peroxide (35% sol.). The reaction mixture is stirred and a sample is taken 7 hours after reaction. Of the total oxidant converted, 30% is used to oxidate the Sulphur compounds, obtaining a conversion in sulphur products of 30.1%, the initial and final compositions in sulphur content for the reaction mixture being the following:

| S in gasoline (ppm) | |
|---|---|
| Initial | 312 |
| Final | 218 |
| Conv. (%) | 30.1 |

Example 4

Preparation of a Microporous Beta Type Material Containing Ti in its Composition, in the Absence of $F^-$ Anions 30 gm of tetraethylorthosilicate (TEOS) are hydrolysed in 34.9 gm of tetraethyl ammonium hydroxide (TEAOH, 35% aqueous solution), and 4.93 gm of $H_2O_2$ (35%). 2.19 gm of Ti tetraethoxide are then added and the mixture is left being stirred and evaporating the ethanol formed in the hydrolysis of the TEOS. A suspension of Beta zeolite seeds is then added (0.34 gm of de-aluminised Beta zeolite in 1.5 gm of water). The molar composition of the gel is as follows:

$TiO_2:15SiO_2:8.6TEAOH:5.3H_2O_2:107H_2O$

The resulting mixture is heated in autoclaves lined internally with PTFE at 140° C. and during the heating the autoclaves are kept rotating (60 rpm). After 20 days of heating, the mixture is centrifuged (pH=11.8) and 26.7 gm of Beta zeolite with high crystallinity are obtained (over 90% through comparison with the standard) for each 100 gm of gel. The Ti content of the zeolite in its calcinated and anhydrous form determined by chemical analysis is 8.5%, expressed as $TiO_2$.

Example 5

Activation of a Catalyst such as that Described in Example 4 by Calcination

This example illustrates the calcination of the Beta zeolite described in the above example to give rise to the catalyst that will be employed in the selective oxidation reaction of compounds with Sulphur.

The solid obtained in the above example is calcinated in an atmosphere of air at 580° C. for 3 hours. The diffraction pattern of the X-rays of the solid obtained indicates that a loss of crystallinity in the material has occurred of around 25%.

Example 6

Use of a Material as Described in Example 5 as a Selective Catalyst in the Selective Oxidation Reaction of Compounds with Sulphur 200 mg of a material such as that described in example 5 are introduced in a glass reactor at 60° C., which contains 5000 mg of light gasoline and 200 mg of hydrogen peroxide (35% sol.). The reaction mixture is stirred and a sample is taken 7 hours after reaction. Of the total oxidant converted, 40% is used to oxidate the Sulphur compounds, obtaining a conversion in sulphur products of 44.9%, the initial and final compositions in sulphur content for the reaction mixture being the following:

| S in gasoline (ppm) | |
|---|---|
| Initial | 312 |
| Final | 172 |
| Conv. (%) | 44.9 |

Example 7

Preparation of a Mesoporous MCM-41 Type Material Containing Ti in its Composition 3.11 gm of cetylmethylammonium bromide (CTAB) are dissolved in 20.88 gm of water. 5.39 gm of tetramethylammonium hydroxide (TMAOH) and 0.21 gm of titanium tetraethoxide are added to this solution and stirred until the titanium is completely dissolved. 3.43 gm of silica are then added giving rise to a gel that is stirred at an ambient temperature for 1 hour at 250 r.p.m. The resulting mixture is introduced in autoclaves and heated to 100° C. at the autogenous pressure of the system for 48 hours. Once this time has elapsed, a solid is recovered by filtration, exhaustively washed with distilled water and dried at 60° C. for 12 hours.

Example 8

Activation of a Catalyst such as that Described in Example 7 by Calcinations 300 gm of the material described in example 7 are placed in a tubular quartz reactor and a dry current of nitrogen of 50 ml·min$^{-1}$ is passed through it while the temperature is raised to 540° C. at 3° C.·min$^{-1}$. Once the temperature is achieved nitrogen is passed for 60 minutes and, once this period has elapsed, the flow of nitrogen is changed for a flow of dry air of 50 ml·min$^{-1}$. The calcination is prolonged for 360 minutes more and the solid is cooled at an ambient temperature. This thermal treatment allows all the occluded organic matter in the pores of the material to be completely eliminated.

This solid has a specific surface of 950 m$^2$·g$^{-1}$, together with a band in the UV-Vis spectrum centred at 220 nm.

Example 9

Use of a Material as Described in Example 8 as a Selective Catalyst in the Selective Oxidation Reaction of Sulphur Compounds 200 mg of a material such as that described in example 8 are introduced in a glass reactor at 80° C., which contains 5000 mg of heavy gasoline and 200 mg of t-butyl hydro-peroxide (35% sol.). The reaction mixture is stirred and a sample is taken 7 hours after reaction. Of the total oxidant converted, 28% is used to oxidate the Sulphur compounds, obtaining a conversion in sulphur products of 22.6%, the initial and final compositions in sulphur content for the reaction mixture being the following:

| S in gasoline (ppm) | |
|---|---|
| Initial | 1449 |
| Final | 1124 |
| Conv. (%) | 22.6 |

Example 10

Sililation of a Material such as that Described in Example 8

2.0 gm of the sample obtained in example 8 are dehydrated at 100° C. and 10$^{-3}$ Tor for 2 hours. The sample is cooled and a solution of 1.88 gm of hexamethyldisilane (CH$_3$)$_3$Si—NH—Si (CH$_3$)$_3$) in 30 gm of toluene is added. The resulting mixture is refluxed at 120° C. for 90 minutes and washed with toluene. The end product is dried at 60° C.

This solid has a specific surface of 935 m$^2$·g$^{-1}$, together with a band in the UV-Vis spectrum centred at 220 nm. Furthermore, the 29Si-MAS-RMN spectrum has a resonance band at −10 ppm assigned to the presence of Si—C bonds.

Example 11

Use of a Material such as that Described in Example 10 as a Selective Catalyst in the Selective Oxidation Reaction of Sulphur Compounds 200 mg of a material such as that described in example 10 are introduced in a glass reactor at 80° C. that contains 5000 mg of heavy gasoline and 200 mg of t-butyl hydro-peroxide (35% sol.). The reaction mixture is stirred and a sample is taken 7 hours after reaction. Of the total oxidant converted, 72% is used to oxidate the Sulphur compounds, obtaining a conversion in sulphur products of 55.7%, the initial and final compositions in sulphur content for the reaction mixture being the following:

| S in gasoline (ppm) | |
|---|---|
| Initial | 1360 |
| Final | 602 |
| Conv. (%) | 55.7 |

Example 12

Activation of a Material such as that Described in Example 7 by Chemical Extraction 5.5 gm of a sample such as that described in example 1 are treated with 276.4 gm of a solution of 0.05 M of sulphuric acid in ethanol. This suspension is stirred a reflux for one hour. The solid is recovered by filtration and washed with ethanol to neutral pH. The resulting solid is dried at 100° C. for 30 minutes. Obtaining 3.51 gm of product. The resulting solid is subjected to a second extraction stage in 3.5 gm of solid, 0.15 M in ethanol/heptane (48:52) are added to a solution of chlorhydric acid, using a liquid/solid ratio of 50. This suspension is refluxed with constant stirring for 24 hours and filtered and washed with ethanol. The resulting solid is dried at 60° C. for 12 hours.

This solid has a specific surface of 983 m$^2$·g$^{-1}$, together with a band in the UV-Vis spectrum centred at 220 nm.

Example 13

Sililation of a Material such as that Described in Example 12

2.0 gm of the sample obtained in example 7 are dehydrated at 100° C. and $10^{-3}$ Tor for 2 hours. The sample is cooled and a solution of 1.88 gm of hexamethyldisilane $(CH_3)_3Si—NH—Si(CH_3)_3)$ in 30 gm of toluene are added. The resulting mixture is refluxed at 120° C. for 90 minutes and washed with toluene. The end product is dried at 60° C.

This solid has a specific surface area of 965 $m^2 \cdot g^{-1}$, together with a band in the UV-Vis spectrum centred at 220 nm. Furthermore, the 29Si-MAS-RMN spectrum has a resonance band at −10 ppm assigned to the presence of Si—C bonds.

Example 14

Use of a Material such as that Described in Example 13 as a Selective Catalyst in the Selective Oxidation Reaction of Sulphur Compounds 200 mg of a material such as that described in example 13 are introduced in a glass reactor at 80° C. which contains 5000 mg of heavy gasoline and 200 mg of t-butyl hydroperoxide (35% sol.). The reaction mixture is stirred and a sample is taken 7 hours after reaction. Of the total oxidant converted, 87% is used to oxidate the Sulphur compounds, obtaining a conversion in sulphur products of 96.0%, the initial and final compositions in sulphur content for the reaction mixture being the following:

| S in gasoline (ppm) | |
| --- | --- |
| Initial | 1383 |
| Final | 57 |
| Conv. (%) | 96.0 |

Example 15

Use of a Material such as that Described in Example 5 as a Selective Catalyst in the Selective Oxidation Reaction of Sulphur Compounds, with the Slow Addition of an Oxidant 200 mg of a material such as that described in example 5 are introduced in a glass reactor at 60° C. which contains 5000 mg of gasoline (50/50 mixture by weight of light gasoline and heavy gasoline) and 200 mg of t-butyl hydrogen peroxide (35% sol.) which is added continuously for 3.5 hours. The reaction mixture is stirred and a sample is taken 7 hours after reaction. Of the total oxidant converted, 53% is used to oxidate the Sulphur compounds, obtaining a conversion in sulphur products of 51.9%, the initial and final compositions in sulphur content for the reaction mixture being the following:

| S in gasoline (ppm) | |
| --- | --- |
| Initial | 946 |
| Final | 455 |
| Conv. (%) | 51.9 |

Example 16

Use of a Mechanical Mixture of the Materials Described in Examples 5 and 13 as a Selective Catalyst in the Selective Oxidation Reaction of Sulphur Compounds 200 mg of a mechanical mixture (50/50 by weight) of the materials described in example 5 and 14 are introduced in a glass reactor at 60° C. which contains 5000 mg of gasoline (50/50 mixture by weight of light gasoline and heavy gasoline) and 200 mg of t-butyl hydrogen peroxide (35% sol.) which are added slowly for 3.5 hours. The reaction mixture is stirred and a sample is taken 7 hours after reaction. Of the total oxidant converted, 75% is used to oxidate the Sulphur compounds, obtaining a conversion in sulphur products of 82.2%, the initial and final compositions in sulphur content for the reaction mixture being the following:

| S in gasoline (ppm) | |
| --- | --- |
| Initial | 921 |
| Final | 164 |
| Conv. (%) | 82.2 |

Example 17

Preparation of an Amorphous $SiO_2$ Type Material Containing Ti in its Composition.

A Titanium compound is anchored to the surface of am amorphous silica (Aerosil) of approximately 400 $m2 \cdot g^{-1}$ (60–200 mesh), according to the following process: 5 gm of and $10^{-1}$ mm of Hg $SiO_2$ are dehydrated at 3009C for 2 hours, with the addition of a solution containing 0.079 gm of titanocenum di-chlorate in 45 gm of anhydrous chloroform. The resulting suspension is stirred at an ambient temperature for 1 hour in an Ar atmosphere. A solvent containing 0.063 gm of tri-ethylamine in 10 gm of chloroform are added to this suspension. A release of white gases is observed and the colour of the solution changes from orangy-red to orangy-yellow. The stirring is prolonged for 1 hour. The solid is recovered by filtration and the excess reactive is eliminated by exhaustive washing with di-chloromethane and dried at 60° C. for 12 hours.

Example 18

Use of a Material as Described in Example 17 as a Selective Catalyst in the Selective Oxidation Reaction of Sulphur Compounds 200 mg of a material such as that described in example 17 are introduced in a glass reactor at 80° C. that contains 5000 mg of gasoline and 200 mg of hydrogen peroxide (35% sol.). The reaction mixture is stirred and a sample is taken 7 hours after reaction. Of the total oxidant converted, 20% is used to oxidate the Sulphur compounds, obtaining a conversion in sulphur products of 12.9%, the initial and final compositions in sulphur content for the reaction mixture being the following:

| S in gasoline (ppm) | |
| --- | --- |
| Initial | 1476 |
| Final | 1286 |
| Conv. (%) | 12.9 |

What is claimed is:

1. A process for eliminating sulphur compounds from a gasoline fraction characterised in that it comprises:

a step of making an oxidation reaction between said sulphur compounds and organic or inorganic hydroperoxides as oxidation agents in the presence of at least one organic-inorganic composite as a catalyst, wherein said catalyst comprises at least the following:

Si,

Ti and silicon linked to carbon said oxidation reaction made at a temperature between 10 and 120° C. and during a reaction time between 2 minutes and 24 hours, and a step of separating the products of the oxidation reaction by distillation, extraction with a solvent or combination of both.

2. A process for the elimination of sulphur compounds from the gasoline fraction according to claim 1, characterised in that said organic-inorganic composite that comprises at least:

Si,

Ti and silicon linked to carbon is obtained by means of a process which is characterised in that species that contain Si—C bonds are introduced in said organic-inorganic composite in a stage during synthesis, by adding said species to a synthesis gel in a reaction mixture.

3. A process for the elimination of sulphur compounds from the gasoline fraction according to claim 1, characterised in that said organic-inorganic composite that includes at least:

Si,

Ti and silicon linked to carbon is obtained by means of a process that comprises a post-synthesis sililation stage, wherein species that contain Si—C bonds are introduced by reacting the inorganic component of the organic-inorganic composite with a silicon containing organic compound.

4. A process for the elimination of sulphur compounds from the gasoline fraction according to claim 1, 2 or 3, characterised in that said organic-inorganic composite is a microporous molecular sieve that comprises at least:

Si,

Ti and silicon linked to carbon.

5. A process for the elimination of sulphur compounds from the gasoline fraction according to claim 4, characterised in that said microporous molecular sieve is a sieve with pores formed by rings with 12 or more members selected from the group consisting of zeolite, ALPO and SAPO.

6. A process for the elimination of sulphur compounds from the gasoline fraction according to claim 5, characterised in that said microporous molecular sieve is a sieve selected from the group consisting of Ti Beta, Ti-ITQ-7, Ti-UTD-1, Ti-Mordenite, Ti-ALPO-5 and Ti-SAPO-5.

7. A process for the elimination of sulphur compounds from the gasoline fraction according to claim 5, characterised in that said microporous molecular sieve is selected from the group consisting of Beta zeolite, any one of its polymorphs and a mixture thereof.

8. A process for the elimination of sulphur compounds from the gasoline fraction according to one of claims 4 to 7, characterised in that said microporous molecular sieve has the following chemical formula in its calcinated and anhydrous state:

$$y(A_{1/n}^{n+}XO_2):tTO_2:SiO_2:xTiO_2$$

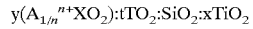

wherein:

X represents at least one trivalent element, y is comprised between 0 and 0.2,

A represents mono-, di- or trivalent cations n 1, 2 or 3,

T represents at least one tetravalent element other than Si and Ti, t is comprised between 0 and 1, and x is comprised between 0.005 and 1000, and in that said microporous molecular sieve is synthesised in the presence of compounds that contain Si—C groups or are subject to a post-synthesis sililation stage creating Si—C bonds.

9. A process for the elimination of sulphur compounds from the gasoline fraction according to claim 6, characterised in that said microporous molecular sieve is synthesized in a medium selected between a medium that includes $F^-$ and a medium that includes $OH^-$ anions.

10. A process for the elimination of sulphur compounds from the gasoline fraction according to claim 8, characterised in that said trivalent X element is selected from the group consisting of Fe, Al, B, Ga, Cr and mixtures thereof.

11. A process for the elimination of sulphur compounds from the gasoline fraction according to claim 8, characterised in that said tetravalent T element is selected between V and Sn.

12. A process for the elimination of sulphur compounds from the gasoline fraction according to claim 8, characterised in that t is comprised between 0 and 0.2.

13. A process for the elimination of sulphur compounds from the gasoline fraction according to claim 8, characterised in that x is comprised between 0.01 and 100.

14. A process for the elimination of sulphur compounds from the gasoline fraction according to claim 1, 2 or 3, characterised in that said organic-inorganic composite is a mesoporous molecular sieve which comprises at least:

Si,

Ti and silicon linked to carbon.

15. A process for the elimination of sulphur compounds from the gasoline fraction according to claim 14, characterised in that the the mesoporous molecular sieve used as a catalyst has a precursor of the following chemical formula:

$$y(A^{n+}_{1/n}XO_2):tTO_2:(1-m)S, O_2:XTiO_2:mR_{(4-p)}SiO_{p/2}:sS$$

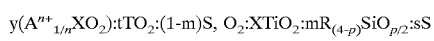

A represents one or more mono-, di- or trivalent compensation cations or mixtures thereof, x varies between 0.005 and 0.1;

X corresponds to a trivalent element y is comprised between 0 and 0.2, n=1, 2 or 3, T corresponds to tetravalent elements other than Si and Ti t is between 0 and 0.2

S is an organic compound, s varies between 0 and 0.5, m is comprised between $10^{-6}$ and 0.66, p is comprised between 3 and 1, R is an alkyl group, an aromatic group, or combination thereof, which comes from the sililating agent that contains the Si—C bonds.

16. A process for the elimination of sulphur compounds from the gasoline fraction according to claim 15, characterized in that the organic compound corresponding to group S is extracted by chemical means.

17. A process for the elimination of sulphur compounds from the gasoline fraction according to claim 14, characterized in that the mesoporous molecular sieve is subjected to a post-synthesis treatment with a sililating agent that leads to the formation of new Si—C bonds.

18. A process for the elimination of sulphur compounds from the gasoline fraction according to claim 14, characterised in that said mesoporous molecular sieve is selected from the group consisting of Ti-MCM-41, TI-MCM-48, Ti-HMS, Ti-SBA-15, and Ti-TUD-1.

19. A process for the elimination of sulphur compounds from the gasoline fraction according to claim 14, characterised in that the precursor of the mesoporous molecular sieve used as a catalyst has the following chemical formula:

wherein:
x is comprised between 0.005 and 0.1;
X represents at least one trivalent element,
y is comprised between 0 and 0.2,
A represents one or more mono-, di- or trivalent compensation cations or mixtures thereof,
n1, 2 or 3,
T represents tetravalent elements other than Si and Ti,
t is comprised between 0 and 0.2,
S represents an organic compound and
s varies between 0 and 0.5.

20. A process for the elimination of sulphur compounds from the gasoline fraction according to claim 16, characterized in that said trivalent element is selected from the group consisting of between Fe, Al, B, Ga, Cr and mixtures thereof.

21. A process for the elimination of sulphur compounds from the gasoline fraction according to claim 19, characterized in that said tetravalent T element is selected between V and Sn.

22. A process for the elimination of sulphur compounds from the gasoline fraction according to claim 19, characterized in that t is comprised between 0 and 0.2.

23. A process for the elimination of sulphur compounds from the gasoline fraction according to claim 19, characterized in that S is selected from the group consisting of a cationic, anionic and neutral surface active agent.

24. A process for the elimination of sulphur compounds from the gasoline fraction according to claim 19, characterized in that S is a cationic surface active agent selected from among:
a compound of the formula $R_1R_2R_3Q^+$ wherein Q is nitrogen or phosphorus and where at least one of the $R_1$, $R_2$, $R_3$ or $R_4$ substituent is an alkyl or aryl group containing more than 6 atoms of carbon and less than 36, and each one of the remaining $R_1$, $R_2$, $R_3$ or $R_4$ groups is a hydrogen or aryl or alkyl group with less than five carbons,
a geminal surface active agent with the formula $R_1R_2R_3QR_4QR_1R_2R_3$ or $R_1R_2R_3Q(R_4R_5QR_6QR_4R_5)Q_nR_1R_2R_3$, where Q is a nitrogen or phosphorus and at least one of the $R_1$–$R_6$ substituent is an alkyl or aryl group with more than six atoms of carbon and less than 36, and each one of the remaining $R_1$–$R_6$ groups are hydrogens or aryl or alkyl groups with less than five atoms of carbon or mixtures thereof, or two of the $R_1$, $R_2$, $R_3$ or $R_4$ groups can be interconnected leading to cycled compounds.

25. A process for the elimination of sulphur compounds from the gasoline fraction according to claim 19, characterized in that S is a cationic surface active agent selected from the group consisting of cetyl tri-methyl ammonium, dodecyl tri-methyl ammonium, cetyl piridinium, ant cetyl methylphosphonium.

26. A process for the elimination of sulphur compounds from the gasoline fraction according to claim 19, characterized in that S is a cationic surface active agent and is introduced in the composition of a synthesis gel in the form of an hydroxide, halide, nitrate, sulphate, carbonate or silicate or a mixture thereof.

27. A process for the elimination of sulphur compounds from the gasoline fraction according to claim 19, characterized in that S is a neutral surface active agent selected from the group consisting of:
a compound of the formula $R_1R_2R_3Q$ wherein Q is nitrogen or phosphorus and where at least one of the $R_1$, $R_2$, or $R_3$ substituents is an alkyl or aryl group containing more than 6 atoms of carbon and less than 36, and each one of the remaining $R_1$, $R_2$, or $R_3$ groups is a hydrogen or aryl or alkyl group with less than five carbons,
a compound from formula nR-EO that consists of alkylpolyethylene oxides, oxides of alkyl-aryl-polyethylene and co-polymers of alkylpolyproylene and alkylethylene,
esters derived from fatty acids obtained by a reaction with short chain alcohols, sugars, amino acids and amines, and
polymers or co-polymers derived from polypropylene, polyethylene, polyacrylamide or polyvinyl alcohol.

28. A process for the elimination of sulphur compounds from the gasoline fraction according to claim 19, characterized in that S is a neutral surface active agent selected from the group consisting of lisolecitin, lecitin, dodecyl pentaoxyethelene ether, phosphatidyl di-lauryl di-ethanol amine, di-galactose diglyceride and monogalactose diglyceride.

29. A process for the elimination of sulphur compounds from the gasoline fraction according to claim 19 or 27, characterized in that S is a neutral surface active agent selected from the group consisting of dodecylamine, cetylamine and cetylpyridine.

30. A process for the elimination of sulphur compounds from the gasoline fraction according to claim 19, characterized in that S is an anionic surface active agent that responds to the formula $RQ^-$ wherein R is an alkyl or aryl group containing more than 6 atoms of carbon and less than 36, and Q is a sulphate, carboxylic or phosphate group.

31. A process for the elimination of sulphur compounds from the gasoline fraction according to claim 19 or 30, characterized in that S is an anionic surface active agent selected from the group consisting of dodecyl sulphate, stearic acid, OT Aerosol and phospholipids.

32. A process for the elimination of sulphur compounds from the gasoline fraction according to claim 19 or 30, characterized in that S is an anionic surface active agent selected between phosphatidyl choline and phosphatyl di-ethanolamine.

33. A process for the elimination of sulphur compounds from the gasoline fraction according to claim 19, characterized in that the organic compound corresponding to the S group is extracted by calcination in air, $N_2$ or another inert gas at temperatures between 300° and 700° C., and the mesoporous molecular sieve is then subjected to a sililation treatment by means of which Si—C bonds are formed.

34. A process for the elimination of sulphur compounds from the gasoline fraction according to claim 19, characterized in that the organic compound corresponding to the S group is extracted by chemical means and the mesoporous molecular sieve is then subjected to a sililation treatment by means of which Si—C bonds are formed.

35. A process for the elimination of sulphur compounds from the gasoline fraction according to claim 34, characterized in that said organic compound is extracted by means of treatment with a mineral acid or organic solution in a solvent selected from the group consisting of water, alcohols, hydrocarbons and a mixture thereof and is then subjected to a sililation treatment by means of which Si—C bonds are formed.

36. A process for the elimination of sulphur compounds from the gasoline fraction according to claim 19, characterized in that said mesoporous molecular sieve includes Ge, V, Sn or mixtures thereof, as well as Si and Ti.

37. A process the elimination of sulphur compounds from the gasoline fraction according to claim 34, characterized in that said mesoporous molecular sieve also comprises Al, B, Ga, Fe, Cr or mixtures thereof.

38. A process the elimination of sulphur compounds from the gasoline fraction according to claim 1, 2 or 3, characterized in that said organic-inorganic composite is a mesoporous molecular sieve that comprises at least:

Si,

Ti and silicon linked to carbon and consists of amorphous inorganic siliceous solids, chemically combined with Ti in a ratio of between 0.2 and 8% by weight of Ti, in the form of an oxide on the total catalyst, and which contain silicon linked to carbon.

39. A process for the elimination of sulphur compounds from the gasoline fraction according to claim 38, characterized in that said amorphous inorganic siliceous solids include at least 90% silica.

40. A process for the elimination of sulphur compounds from the gasoline fraction according to claim 38, characterized in that said amorphous inorganic siliceous solids are pyrogenic silicas selected between cab-o-sil and Aerosil with specific surfaces of between 40 and 450 $m^{2 \cdot g-1}$ and a particle size of between 0.007 and 0.05 microns.

41. A process for the elimination of sulphur compounds from the gasoline fraction according to claim 39, characterized in that said amorphous inorganic siliceous solids are synthetic inorganic oxides of silicon.

42. A process for the elimination of sulphur compounds from the gasoline fraction according to claim 41, characterized in that said synthetic inorganic oxide of silicon is silica gel.

43. A process for the elimination of sulphur compounds from the gasoline fraction according to claim 38, characterized in that said amorphous inorganic siliceous solid, further to Si and Ti, also comprises elements selected from the group consisting of V, B, Zr, Mo and mixtures thereof in a percentage of the total weight, and in the form of oxides, of less than 8%.

44. A process for the elimination of sulphur compounds from the gasoline fraction according to any of claims 38 to 43, characterized in that said amorphous inorganic siliceous solid includes quantities of between 0.01 and 4% by weight of promoters of the alkaline metal or alkali-earth groups or mixtures thereof, in the form of oxides.

45. A process for the elimination of sulphur compounds from the gasoline fraction according to claim 1, characterized in that said oxidation reaction is carried out in a discontinuous reactor, a CSTR reactor, in a fixed bed continuous reactor, in a fluidised bed reactor, or a boiling bed reactor.

46. A process for the elimination of sulphur compounds from the gasoline fraction according to claim 45, characterized in that said oxidation is carried out in a discontinuous reactor, with a weight ratio of the gasoline fraction to the catalyst of between 5 and 200 and a weight ratio between the gasoline fraction and the oxidising agent of between 200 to 10.

47. A process for the elimination of sulphur compounds from the gasoline fraction according to claim 46, characterized in that said weight ratio of the gasoline fraction to the catalyst is comprised between 10 and 100.

48. A process the elimination of sulphur compounds from the gasoline fraction according to claim 46, characterized in that said weight ratio of the gasoline fraction and the oxidating agent is between 100 and 30.

49. A process for the elimination of sulphur compounds from the gasoline fraction according to claim 1, characterized in that said oxidation reaction is carried out at a temperature of between 20 and 80° C.

50. A process for the elimination of sulphur compounds from the gasoline fraction according to claim 1, characterized in that said oxidation reaction includes separation of the products by means of a stage selected between distillation, extraction and both, with a solvent and total or partial re-cycling of the non-reacted products to the reactor.

* * * * *